(12) United States Patent
Castinado et al.

(10) Patent No.: US 11,783,271 B2
(45) Date of Patent: Oct. 10, 2023

(54) SYSTEM FOR DIRECTING RESOURCE TRANSFERS BASED ON RESOURCE DISTRIBUTION DATA

(71) Applicant: BANK OF AMERICA CORPORATION, Charlotte, NC (US)

(72) Inventors: Joseph Benjamin Castinado, North Glenn, CO (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 138 days.

(21) Appl. No.: 17/140,525

(22) Filed: Jan. 4, 2021

(65) Prior Publication Data
US 2022/0215330 A1 Jul. 7, 2022

(51) Int. Cl.
*G06Q 10/083* (2023.01)
*G06Q 10/0833* (2023.01)
(Continued)

(52) U.S. Cl.
CPC ......... *G06Q 10/083* (2013.01); *G06Q 10/047* (2013.01); *G06Q 10/0631* (2013.01); *G06Q 10/0833* (2013.01); *G06Q 10/08355* (2013.01)

(58) Field of Classification Search
CPC .............................................. G06Q 10/08355
See application file for complete search history.

(56) References Cited

U.S. PATENT DOCUMENTS 6,937,992 B1 * 8/2005 Benda ................ G06Q 30/0202
705/28
7,904,352 B2 * 3/2011 Carruthers ............. G06Q 40/12
705/16
(Continued)

FOREIGN PATENT DOCUMENTS

CN 107220796 A * 9/2017
EP 1521196 A2 * 4/2005 ........... G06Q 10/043
(Continued)

OTHER PUBLICATIONS

English translation of CN-107220796-A (Year: 2017).*
(Continued)

*Primary Examiner* — Emmett K. Walsh
*Assistant Examiner* — Michael C Moroney
(74) *Attorney, Agent, or Firm* — Moore & Van Allen PLLC; R. W. McCord Rayburn (57) ABSTRACT

Systems, computer program products, and methods are described herein for directing resource transfers based on resource distribution data. The present invention may be configured to receive resource distribution data associated with a plurality of resource distributions, where the resource distribution data includes a plurality of resources, a plurality of receiving locations, and a plurality of delivery locations. The present invention may be further configured to receive a target efficiency rate for transfer containers corresponding to a percentage of capacity of the transfer containers occupied while the transfer containers are transferring the resources. The present invention may be further configured to determine, based on the resource distribution data and the target efficiency rate, instructions for achieving the target efficiency rate for the transfer containers while receiving and delivering the plurality of resources from the plurality of receiving locations and to the plurality of delivery locations.

20 Claims, 2 Drawing Sheets

(51) Int. Cl.
   *G06Q 10/0835* (2023.01)
   *G06Q 10/0631* (2023.01)
   *G06Q 10/047* (2023.01)

(56) References Cited

U.S. PATENT DOCUMENTS

| | | | | |
|---|---|---|---|---|
| 9,928,540 | B1* | 3/2018 | Gerard | G06Q 10/083 |
| 2006/0224426 | A1* | 10/2006 | Goossens | G06Q 10/08 |
| | | | | 705/80 |
| 2007/0005236 | A1* | 1/2007 | Peterkofsky | G06Q 10/083 |
| | | | | 701/422 |
| 2008/0312991 | A1* | 12/2008 | Bharadwaj | G06Q 10/08 |
| | | | | 705/7.29 |
| 2009/0037234 | A1* | 2/2009 | Gabrielson | G06Q 10/025 |
| | | | | 705/311 |
| 2010/0287073 | A1* | 11/2010 | Kocis | G06Q 10/047 |
| | | | | 705/28 |
| 2013/0159208 | A1* | 6/2013 | Song | G06Q 10/08 |
| | | | | 705/338 |
| 2019/0195638 | A1* | 6/2019 | Tajammul | G01C 21/3453 |
| 2019/0293443 | A1* | 9/2019 | Kelly | G01C 21/3492 |
| 2020/0271461 | A1* | 8/2020 | Yamashita | G01C 21/3407 |
| 2020/0364664 | A1* | 11/2020 | Chen | G06Q 10/04 |
| 2021/0254988 | A1* | 8/2021 | Styles | G07C 5/08 |
| 2021/0350569 | A1* | 11/2021 | Choo | G06K 9/6262 |
| 2023/0042127 | A1* | 2/2023 | Anand P.S. | G06Q 10/083 |

FOREIGN PATENT DOCUMENTS

| | | |
|---|---|---|
| JP | H07334797 A | * 12/1995 |
| WO | WO-2021040612 A1 | * 3/2021 |

OTHER PUBLICATIONS

Castellucci et al., "Output maximization container loading problem with time availability constraints"; Published 2019; Operations Research Perspectives; vol. 6; Document pp. 1-14 (Year: 2019).*

* cited by examiner

SYSTEM FOR DIRECTING RESOURCE TRANSFERS BASED ON RESOURCE DISTRIBUTION DATA

FIELD OF THE INVENTION

The present invention embraces a system for directing resource transfers based on resource distribution data.

BACKGROUND

An entity may initiate, with another entity, a resource distribution of an amount of resources and request a transfer of resources to or from the other entity. However, transferring the amount of resources in a transfer container may not efficiently use the capacity of the transfer container.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for directing resource transfers based on resource distribution data is presented. The system may include at least one non-transitory storage device and at least one processing device coupled to the at least one non-transitory storage device, where the at least one processing device is configured to receive resource distribution data associated with a plurality of resource distributions, where the plurality of resource distributions are associated with a plurality of entities, and where the resource distribution data includes a plurality of resources, a plurality of receiving locations, and a plurality of delivery locations, receive a target efficiency rate for transfer containers, where the target efficiency rate corresponds to a percentage of capacity of the transfer containers occupied while the transfer containers are transferring the resources, determine, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations, and provide, to one or more user devices, the instructions for achieving the target efficiency rate for the transfer containers.

In some embodiments, the resource distribution data includes, for each resource distribution one or more goods, from the plurality of resources, to be transferred, a receiving location, from the plurality of receiving locations, for receiving the one or more goods, and a delivery location, from the plurality of delivery locations, for delivering the goods.

In some embodiments, the plurality of entities includes a plurality of merchants, and the plurality of delivery locations are associated with the plurality of merchants.

In some embodiments, the plurality of entities includes a plurality of merchants, and the plurality of delivery locations are associated with customers of the plurality of merchants.

In some embodiments, the transfer containers include at least one of shipping containers, boxes, semi-trailers, box trucks, flatbed trailers, refrigerator trailers, vans, or rail cars.

In some embodiments, the one or more user devices are associated with a carrier for transporting goods via at least one of land, sea, or air.

In some embodiments, the plurality of resources includes a plurality of goods, and the instructions include carrier resources for transferring the plurality of goods.

In some embodiments, the carrier resources include different types of motor vehicles, different types of vessels, and different types of aircraft.

In some embodiments, the plurality of resources includes a plurality of goods, and the instructions include an order for receiving the plurality of goods from the plurality of receiving locations and delivering the plurality of goods to the plurality of delivery locations while maintaining the target efficiency rate for the transfer containers.

In some embodiments, the at least one processing device is configured to determine, based on the resource distribution data and the target efficiency rate, first instructions for achieving the target efficiency rate for a first transfer container of the transfer containers while receiving, with the first transfer container, first goods from a first receiving location associated with a first merchant and second goods from a second receiving location associated with a second merchant and delivering, with the first transfer container, the first goods to a first delivery location and the second goods to a second delivery location and provide, to a user device associated with the first transfer container, the first instructions including directions to receive the first goods at the first receiving location, after receiving the first goods, receive the second goods at the second receiving location, after receiving the second goods, deliver the second goods to the second delivery location, and after delivering the second goods, deliver the first goods to the first delivery location.

In some embodiments, the at least one processing device is configured to determine, based on the resource distribution data, at least one of a first portion of insurance for which the first merchant is responsible and a second portion of insurance for which the second merchant is responsible, a first time for receiving the first goods from the first receiving location and a second time for receiving the first goods from the second receiving location, an order of packing the first goods within the first transfer container, or types of goods permitted within the first transfer container.

In some embodiments, the at least one processing device is configured to determine the instructions for achieving the target efficiency rate for the transfer containers using a machine learning model.

In some embodiments, the transfer containers include an autonomous vehicle and the at least one processing device is configured to provide a command to cause the autonomous vehicle to navigate to a first receiving location of the plurality of receiving locations, receive first goods at the first receiving location, navigate to a second receiving location of the plurality of receiving locations, receive second goods at the second receiving location, navigate to a first delivery location, and deliver the first goods and the second goods to the first delivery location.

In another aspect, a computer program product for directing resource transfers based on resource distribution data is presented. The computer program product may include a non-transitory computer-readable medium including code causing a first apparatus to receive resource distribution data associated with a plurality of resource distributions, where the plurality of resource distributions are associated with a plurality of entities, and where the resource distribution data includes a plurality of resources, a plurality of receiving locations, and a plurality of delivery locations, receive a target efficiency rate for transfer containers, where the target efficiency rate corresponds to a percentage of capacity of the transfer containers occupied while the transfer containers are transferring the resources, determine, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations, and provide, to one or more user devices, the instructions for achieving the target efficiency rate for the transfer containers.

In some embodiments, the resource distribution data includes, for each resource distribution one or more goods, from the plurality of resources, to be transferred, a receiving location, from the plurality of receiving locations, for receiving the one or more goods, and a delivery location, from the plurality of delivery locations, for delivering the goods.

In some embodiments, the plurality of entities includes a plurality of merchants, and the plurality of delivery locations are associated with the plurality of merchants.

In some embodiments, the plurality of entities includes a plurality of merchants, and the plurality of delivery locations are associated with customers of the plurality of merchants.

In yet another aspect, a method for directing resource transfers based on resource distribution data is presented. The method may include receiving resource distribution data associated with a plurality of resource distributions, where the plurality of resource distributions are associated with a plurality of entities, and where the resource distribution data includes a plurality of resources, a plurality of receiving locations, and a plurality of delivery locations, receiving a target efficiency rate for transfer containers, where the target efficiency rate corresponds to a percentage of capacity of the transfer containers occupied while the transfer containers are transferring the resources, determining, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations, and providing, to one or more user devices, the instructions for achieving the target efficiency rate for the transfer containers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspects of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted into and/or removed from the external apparatus by a user, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

Figure 1:
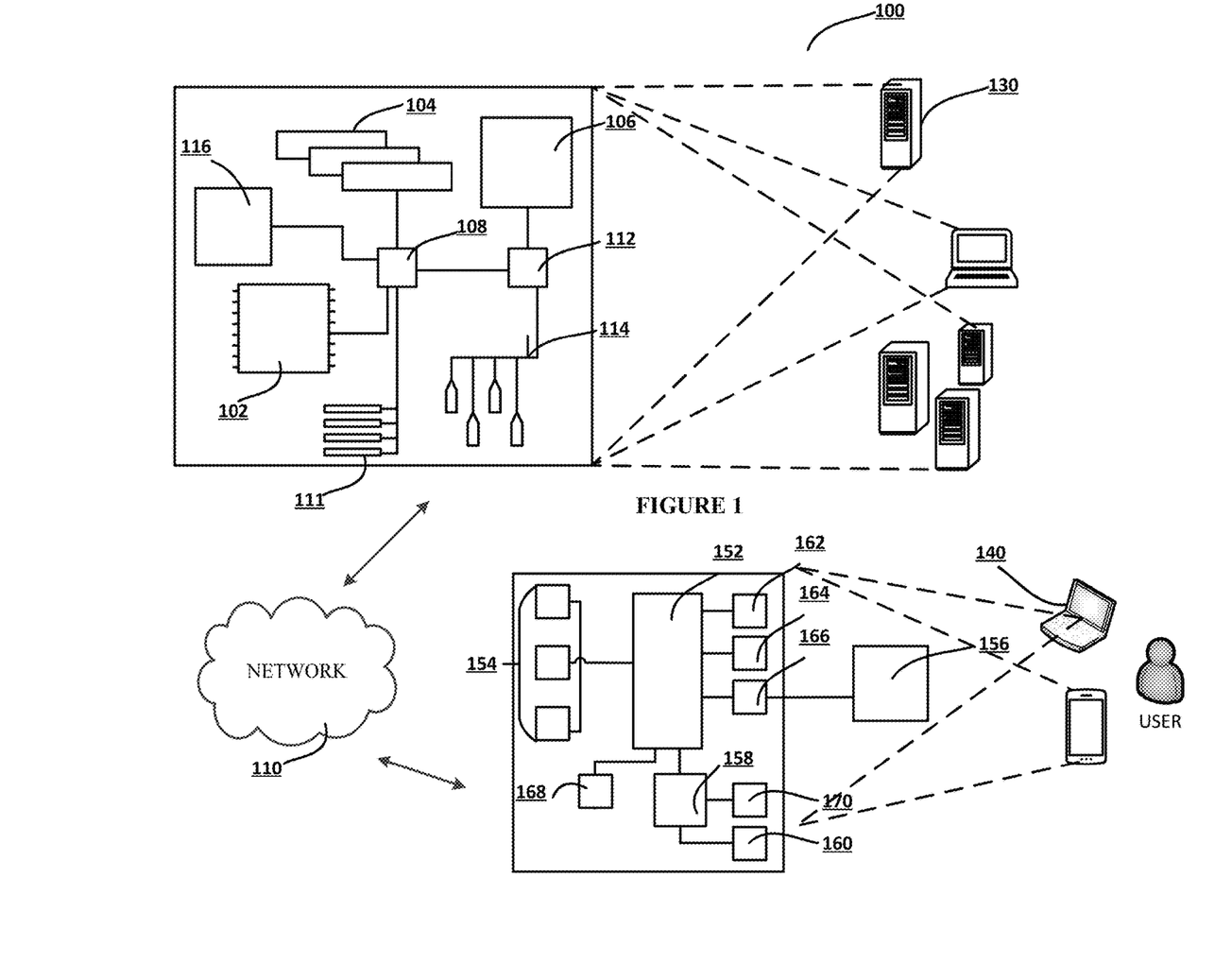
FIG. 1 illustrates technical components of a system for directing resource transfers based on resource distribution data, in accordance with an embodiment of the invention.

FIG. 1 presents an exemplary block diagram of a system environment 100 for directing resource transfers based on resource distribution data within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to execute resource distributions and/or allocations of resources using one or more applications stored thereon. The one or more applications may be configured to communicate with the system 130, execute a resource distribution and/or an allocation of resources, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for directing resource transfers based on resource distribution data, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, and/or the like. The system 130 may be located at a facility associated with the entity and/or remotely from the facility associated with the entity.

The memory 104 may store information within the system 130. In one implementation, the memory 104 may be a volatile memory unit or units, such as volatile random access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include a user input system and/or a point-of-sale system (e.g., similar to the system 130 and/or the user input system 140) associated with an entity (e.g., a merchant, a service provider, an establishment, a group, an institution, and/or the like), a resource management system (e.g., similar to the system 130) associated with another entity (e.g., a financial institution and/or the like), another user input system (e.g., similar to the user input system 140) associated with a user (e.g., a customer, a prospective customer, and/or the like), and one or more other user input systems (e.g., similar to the user input system 140) associated with one or more other entities (e.g., carriers for transporting goods, merchants, service providers, establishments, groups, institutions, and/or the like). For example, a user (e.g., a customer) and an entity (e.g., a merchant) may conduct a resource distribution using a user input system and/or a point-of-sale system associated with the entity and another user input system associated with the user. The user input system and/or the point-of-sale system associated with the entity may communicate with the resource management system to complete the resource distribution. The resource management system may communicate with one or more other user input systems associated with one or more other entities (e.g., carriers for transporting goods) based on the resource distribution. In some embodiments, the user input system and/or the point-of-sale system associated with the entity, the resource management system, the other user input system associated with the user, and/or the one or more other user input systems associated with one or more other entities may perform one or more of the steps described herein with respect to a process flow described herein with respect to FIG. 2.

As another example, a user associated with an entity (e.g., an employee of a merchant) may use a user input system associated with the entity to request a transfer of resources from another entity (e.g., a supplier and/or a distributor) and initiate a resource distribution. The user input system associated with the entity, another user input system associated with the other entity, and/or another system associated with the entity and/or the other entity may provide resource distribution data associated with the resource distribution and/or the requested transfer to a resource management system (e.g., associated with a financial institution and/or the like). In some embodiments, the user input system associated with the entity, the other user input system associated with the other entity, the other system associated with the entity and/or the other entity, and/or the resource management system may perform one or more of the steps described herein with respect to a process flow described herein with respect to FIG. 2.

As yet another example, users associated with entities (e.g., merchants) may use user input systems associated with the entities to request transfers of resources from other entities (e.g., suppliers, distributors, and/or the like) and initiate resource distributions. The user input systems associated with the entities, other user input systems associated with the other entities, and/or other systems associated with the entities and/or the other entities may provide resource distribution data associated with the resource distributions and/or the requested transfers to one or more resource management systems (e.g., associated with financial institutions and/or the like). In some embodiments, the user input systems associated with the entities, the other user input system associated with the other entities, the other systems associated with the entities and/or the other entities, and/or the resource management systems may perform one or more of the steps described herein with respect to a process flow described herein with respect to FIG. 2.

As yet another example, users (e.g., customers) may use user input systems associated with the users to request transfers of resource from entities (e.g., merchants) and initiate resource distributions. The user inputs systems associated with the users, other user input systems associated with the entities, and/or other systems associated with the entities may provide resource distribution data associated with the resource distributions and/or the requested transfers to one or more resource management systems (e.g., associated with financial institutions and/or the like). In some embodiments, the user inputs systems associated with the users, the other user input systems associated with the entities, the other systems associated with the entities, and/or the resource management systems may perform one or more of the steps described herein with respect to a process flow described herein with respect to FIG. 2.

As noted above, an entity may initiate, with another entity, a resource distribution of an amount of resources and request a transfer of resources to or from the other entity. However, transferring the amount of resources in a transfer container may not efficiently use the capacity of the transfer container. Accordingly, transferring the amount of resources in the transfer container based on the request to transfer resources may consume resources, such as computing resources (e.g., processing resources, memory resources, power resources, communication resources, and/or the like), network resources, physical resources (e.g., fuel, lifespan of equipment, and/or the like), financial resources, and/or the like.

Some embodiments described herein provide a system, a computer program product, and/or a method for directing resource transfers based on resource distribution data. For example, a system may be configured to receive resource distribution data associated with a plurality of resource distributions, where the plurality of resource distributions are associated with a plurality of entities, and where the resource distribution data includes a plurality of resources, a plurality of receiving locations, and a plurality of delivery locations. The system may be further configured to receive a target efficiency rate for transfer containers, where the target efficiency rate corresponds to a percentage of capacity of the transfer containers occupied while the transfer containers are transferring the resources. The system may be further configured to determine, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations. The system may be further configured to provide, to one or more user devices, the instructions for achieving the target efficiency rate for the transfer containers. By determining, based on the resource distribution data and the target efficiency rate, instructions for achieving the target efficiency rate for the transfer containers and providing the instructions to one or more user devices (e.g., associated with a carrier for transporting goods), the system may conserve resources, such as computing resources (e.g., processing resources, memory resources, power resources, communication resources, and/or the like), network resources, physical resources (e.g., fuel, lifespan of equipment, and/or the like), financial resources, and/or the like that would otherwise be consumed by transferring resources in transfer containers based on requests to transfer resources.

As another example, a system (e.g., associated with a financial institution) may be configured to receive transaction data associated with a plurality of transactions, where the plurality of transactions are associated with a plurality of merchants, and where the transaction data includes a plurality of goods (e.g., to be transferred), a plurality of receiving locations, and a plurality of delivery locations. The system may be further configured to receive a target efficiency rate for transfer containers (e.g., shipping containers, boxes, semi-trailers, box trucks, flatbed trailers, refrigerator trailers, vans, rail cars, motor vehicles, and/or the like), where target efficiency rate corresponds to a percentage of capacity of the transfer containers occupied while the transfer containers are transferring the goods. The system may be further configured to determine, based on the transaction data and the target efficiency rate, instructions for achieving the target efficiency rate for the transfer containers while receiving, with the transfer containers, the plurality of goods from the plurality of receiving locations and delivering, with the transfer containers, the plurality of goods to the plurality of delivery locations. The system may be further configured to provide, to one or more user devices and/or systems (e.g., associated with a carrier for transporting goods). By determining, based on the transaction data and the target efficiency rate, instructions for achieving the target efficiency rate for the transfer containers and providing the instructions to one or more user devices and/or systems (e.g., associated with a carrier for transporting goods), the system may conserve resources, such as computing resources (e.g., processing resources, memory resources, power resources, communication resources, and/or the like), network resources, physical resources (e.g., fuel, lifespan of equipment, and/or the like), financial resources, and/or the like that would otherwise be consumed by transferring resources in transfer containers based on requests to transfer resources. For example, the instructions may include types of transfer containers to use, an order and/or schedule for receiving goods at the receiving location and/or delivering goods at delivery locations, types of goods to combine within a transfer container, an order of packing transfer containers, responsibility for insurance for goods, and/or the like. In some embodiments, the merchants may not be required to promise, guarantee, and/or the like amounts for transfers, but the system may promise, guarantee, and/or the like efficiency rates to a carrier, which may permit reduced consumption of resources, reduced costs, and/or the like associated with the transfers. Additionally, or alternatively, the system may assist smaller merchants (e.g., pop-up shops and/or the like) with relatively lower transfer volumes to obtain reduced costs for transfers.

Figure 2:
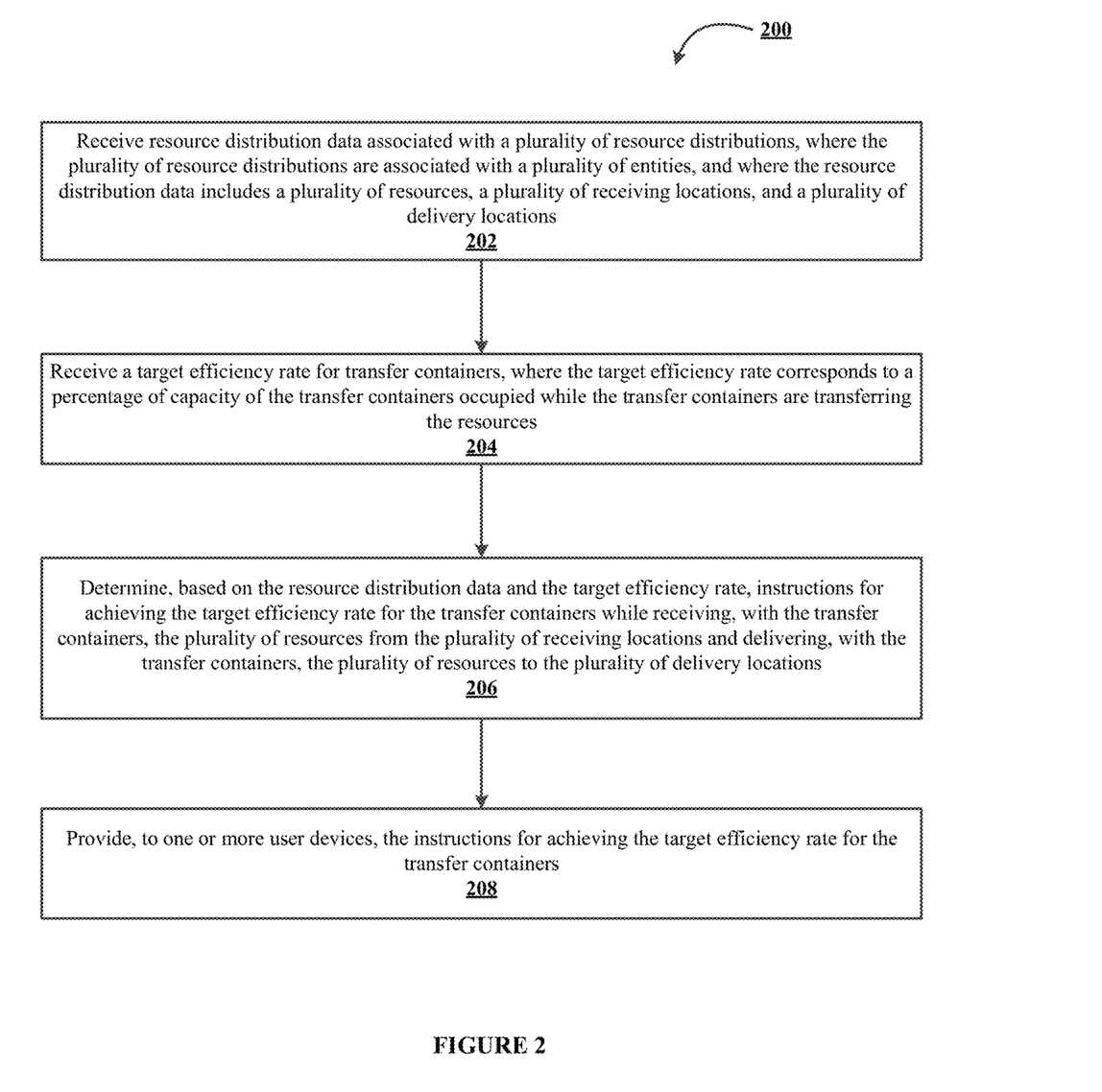
FIG. 2 illustrates a process flow for tracking user eye focus for directing resource transfers based on resource distribution data, in accordance with an embodiment of the invention.

FIG. 2 illustrates a process flow 200 for directing resource transfers based on resource distribution data within a technical environment, in accordance with an embodiment of the invention. In some embodiments, a system (e.g., similar to one or more of the systems described herein with respect to FIG. 1) may perform one or more of the steps of process flow 200.

As shown in block 202, the process flow 200 may include receiving resource distribution data associated with a plurality of resource distributions, where the plurality of resource distributions are associated with a plurality of entities (e.g., customers, merchants, suppliers, distributors, and/or the like), and where the resource distribution data includes a plurality of resources, a plurality of receiving locations (e.g., locations, addresses, and/or the like for a carrier to receive, pickup, retrieve, obtain, accept, collect and/or the like resources), and a plurality of delivery locations (e.g., locations, addresses, and/or the like for a carrier to deliver, drop off, offload, distribute, supply, convey, provide, and/or the like resources). For example, a resource management system associated with a financial institution may receive resource distribution data from one or more user input systems, systems, and/or the like associated with customers, merchants, suppliers, distributors, and/or the like.

In some embodiments, the resource distribution data may include, for one or more resource distributions, one or more goods, from the plurality of resources, to be transferred, a receiving location, from the plurality of receiving locations, for receiving the one or more goods, and/or a delivery location, from the plurality of delivery locations, for delivering the goods. For example, the resource distribution data may include, for each resource distribution, one or more goods to be transferred, a receiving location for receiving the one or more goods (e.g., a location, an address, and/or the like for a carrier to receive, pickup, retrieve, obtain, accept, collect and/or the like one or more goods), and/or a delivery location for delivering the goods (e.g., a location, an address, and/or the like for a carrier to deliver, drop off, offload, distribute, supply, convey, provide, and/or the like one or more goods).

In some embodiments, the plurality of entities may include a plurality of merchants, and the plurality of delivery locations may be associated with the plurality of merchants. For example, the resource distribution data may be associated with resource distributions between merchants and suppliers and/or distributors, where the merchants have requested transfers of resources from the suppliers and/or distributors to the merchants at locations associated with the merchants. In some embodiments, each merchant may be associated with a different delivery location. Additionally, or alternatively, two or more merchants may be associated with a same delivery location (e.g., a warehouse shared by merchants, a loading dock shared by merchants, and/or the like). In some embodiments, the plurality of receiving locations may be associated with a plurality of suppliers and/or distributors. For example, each supplier and/or distributor may be associated with a different receiving location. Additionally, or alternatively, two or more suppliers and/or distributors may be associated with a same receiving location (e.g., a warehouse shared by suppliers and/or distributors, a loading dock shared by suppliers and/or distributors, and/or the like).

In some embodiments, the plurality of entities may include a plurality of merchants, and the plurality of delivery locations may be associated with customers of the plurality of merchants. For example, the resource distribution data may be associated with resource distributions between merchants and customers, where the merchants have requested transfers of resources from the merchants (e.g., addresses associated with the merchants and/or the like) to the customers at locations associated with the customers. In some embodiments, each customer may be associated with a different delivery location. Additionally, or alternatively, two or more customers may be associated with a same delivery location (e.g., a warehouse shared by customers, a loading dock shared by customers, an apartment complex, a post office, and/or the like). In some embodiments, the plurality of receiving locations may be associated with a plurality of merchants. For example, each merchant may be associated with a different receiving location. Additionally, or alternatively, two or more merchants may be associated with a same receiving location (e.g., a warehouse shared by merchants, a loading dock shared by merchants, and/or the like).

In some embodiments, the transfer containers may include one or more shipping containers, boxes, semi-trailers, box trucks, flatbed trailers, refrigerator trailers, vans, rail cars, motor vehicles, and/or the like. For example, for a given resource distribution, the transfer container may be a shipping container, which may be transported on land by rail and/or on a chassis pulled by a semi-truck, on sea by a vessel, and/or the like.

As shown in block 204, the process flow 200 may include receiving a target efficiency rate for transfer containers (e.g., shipping containers, boxes, semi-trailers, box trucks, flatbed trailers, refrigerator trailers, vans, rail cars, motor vehicles, and/or the like), where the target efficiency rate corresponds to a percentage of capacity of the transfer containers occupied while the transfer containers are transferring the resources (e.g., a percent-full of the transfer containers during transfer and/or the like). For example, a resource management system associated with a financial institution may receive a target efficiency rate for transfer containers from one or more user input systems, systems, and/or the like associated with a carrier.

In some embodiments, the resource management system may provide a graphical user input to one or more user input systems, systems, and/or the like associated with a carrier and receive, via the graphical user input, the target efficiency rate. For example, the resource management system may determine, based on the resource distribution data, a range of possible efficiency rates for the transfer containers, provide the range via a graphical user input including selection features (e.g., sliders, text boxes, dropdown menus, radio buttons, and/or the like), and receive the target efficiency rate based on user input via the graphical user input.

In some embodiments, the target efficiency rate may be a threshold, a range, a value, and/or the like. Additionally, or alternatively, the target efficiency rate may vary based on a type of transfer container (e.g., a shipping container, a box, a semi-trailer, a box truck, a flatbed trailer, a refrigerator trailer, a van, a rail car, and/or the like), a type of transfer (e.g., by land, sea, air, and/or the like), a carrier resource transferring the transfer container (e.g., a motor vehicle or an aircraft), a type of carrier resource transferring the transfer container (e.g., a semi-truck and trailer or a van), and/or the like. For example, a target efficiency rate for a shipping container may be greater than a target efficiency rate for a van.

As shown in block 206, the process flow 200 may include determining, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations. For example, a resource management system associated with a financial institution may determine, based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations. In some embodiments, the process flow 200 may include determine the instructions for achieving the target efficiency rate for the transfer containers using a machine learning model.

In some embodiments, the plurality of resources may include a plurality of goods and determining the instructions may include determining an order for receiving the plurality of goods from the plurality of receiving locations and delivering the plurality of goods to the plurality of delivery locations while maintaining the target efficiency rate for the transfer containers. For example, the instructions may include an order in which goods should be received from the receiving locations and delivered to the delivery locations to maintain the target efficiency rate for the transfer containers, ensure an appropriate order of packing within the transfer containers, ensure appropriate combinations of types of goods within the transfer containers, and/or the like.

Additionally, or alternatively, the instructions may include directions for complying with regulations (e.g., shipping laws and/or regulations, logistics laws and/or regulations, and/or the like). For example, the instructions may include an order in which goods should be received from the receiving locations and delivered to the delivery locations to ensure that highly flammable goods are not combined with highly combustible goods, to ensure that refrigerated goods are refrigerated and not combined with goods that cannot be refrigerated, to ensure that combinations of goods comply with relevant regulations regarding the combination of types of goods.

In some embodiments, the instructions may include instructions for delivering, with a first transfer container, a portion of the plurality of resources to an intermediate delivery location (e.g., a warehouse, a distribution center, and/or the like). Additionally, or alternatively, the instructions may include instructions for receiving, with a second transfer container, the portion of the plurality of resources at the intermediate delivery location and delivering the portion of the plurality of resources to a delivery location. For example, the instructions may instruct a carrier to transfer resources from a supplier and/or a distributor, store the resources at a warehouse, a distribution center, and/or the like (e.g., for a time period and/or the like), pickup the resources and/or a portion of the resources at the warehouse, the distribution center, and/or the like, and deliver the resources and/or the portion of the resources to a final delivery location.

As shown in block 208, the process flow 200 may include providing, to one or more user devices, the instructions for achieving the target efficiency rate for the transfer containers. For example, a resource management system associated with a financial institution may provide, to one or more user devices, systems, and/or the like associated with a carrier, the instructions for achieving the target efficiency rate for the transfer containers. For example, the one or more user devices, systems, and/or the like may be associated with a carrier for transporting goods via land, sea, air, and/or the like.

In some embodiments, the plurality of resources may include a plurality of goods, and the instructions may include carrier resources for transferring the plurality of goods. For example, the carrier resources may include different types of motor vehicles, different types of vessels, different types of aircraft, and/or the like, and the instructions may identify which carrier resource (e.g., a motor vehicle or an aircraft) and/or type of carrier resource (e.g., a semi-truck and trailer or a van) to use to transfer the goods.

As noted above, the instructions may include an order in which goods should be received from the receiving locations and delivered to the delivery locations to maintain the target efficiency rate for the transfer containers, ensure an appropriate order of packing within the transfer containers, ensure appropriate combinations of types of goods within the transfer containers, and/or the like. In some embodiments, the process flow 200 may include determining, based on the resource distribution data and the target efficiency rate, first instructions for achieving the target efficiency rate for a first transfer container of the transfer containers while receiving, with the first transfer container, first goods from a first receiving location associated with a first merchant and second goods from a second receiving location associated with a second merchant and delivering, with the first transfer container, the first goods to a first delivery location and the second goods to a second delivery location and providing, to a user device associated with the first transfer container, the first instructions. In such embodiments, the first instructions may include directions to receive the first goods at the first receiving location, after receiving the first goods, receive the second goods at the second receiving location, after receiving the second goods, deliver the second goods to the second delivery location, and after delivering the second goods, deliver the first goods to the first delivery location.

In some embodiments, the process flow 200 may include determining, based on the resource distribution data, an achievable efficiency rate for the transfer containers, determining whether the achievable efficiency rate corresponds to or is greater than the target efficiency rate, and providing, to the one or more user devices and based on determining that the achievable efficiency rate does not correspond to and is not greater than the target efficiency rate, a notification that the target efficiency rate cannot be achieved. For example, a resource management system associated with a financial institution may receive the resource distribution data, receive the target efficiency rate for the transfer containers, and determine, based on the resource distribution data, an achievable efficiency rate for the transfer containers. In such an example, the resource management system may determine whether the achievable efficiency rate is equal to or greater than the target efficiency rate, and provide, based on determining that the achievable efficiency rate is not equal to or greater than the target efficiency rate, a notification indicating that the target efficiency rate cannot be achieved. In some embodiments, the notification may include an option to accept the achievable efficiency rate, authorize the transfer(s) at the achievable efficiency rate, reject the transfer(s), and/or the like.

In some embodiments, the process flow 200 may permit multiple merchants and/or customers to authorize cooperative arrangements for more efficient transfers, reduced cost, and/or the like. For example, the process flow 200 may include determining, based on the resource distribution data, that a first merchant of the plurality of entities requested a first transfer of a first quantity of first goods from a first receiving location to a first delivery location and determining, based on the resource distribution data, that a second merchant of the plurality of entities requested a second transfer of a second quantity of the first goods from the first receiving location to a second delivery location. The process flow 200 may further include determining determine whether a distance between the first delivery location and the second delivery location satisfies a threshold, providing, to a first user device associated with the first merchant and based on determining that the distance between the first delivery location and the second delivery location satisfies the threshold, a first request for authorization to combine the first transfer with the second transfer, and providing, to a second user device associated with the second merchant and based on determining that the distance between the first delivery location and the second delivery location satisfies the threshold, a second request for authorization to combine the second transfer with the first transfer. The process flow 200 may further include receiving, from the first user device, a first authorization to combine the first transfer with the second transfer and receiving, from the second user device, a second authorization to combine the second transfer with the first transfer. The process flow 200 may further include providing, to one or more user devices associated with a carrier and based on receiving the first authorization and the second authorization, first instructions, where the first instructions include directions to receive the first quantity and the second quantity of the first goods from the first receiving location with a first transfer container, after receiving the first quantity and the second quantity of the first goods from the first receiving location, deliver, with the first transfer container, the first quantity of first goods to the first delivery location, and after receiving the first quantity and the second quantity of the first goods from the first receiving location, deliver, with the first transfer container, the second quantity of first goods to the second delivery location. In some embodiments, the process flow 200 may include determining, based on the resource distribution data, a first portion of insurance for which the first merchant is responsible and a second portion of insurance for which the second merchant is responsible, a first time for receiving the first goods from the first receiving location and a second time for receiving the first goods from the second receiving location, an order of packing the first goods within the first transfer container, types of goods permitted within the first transfer container, and/or the like.

Additionally, or alternatively, the process flow 200 may permit a merchant and/or a customer to obtain resource transfers from three or more suppliers and/or merchants with a single delivery to a delivery location (e.g., daisy-chaining shipments and/or the like) by determining and providing instructions to receive resources from each of the suppliers and/or merchants before delivering the resources to the delivery location.

In some embodiments, the transfer containers may include one or more autonomous vehicles (e.g., a self-driving van, a self-driving semi-truck and/or trailer, a self-piloting drone, a self-piloting vessel, a self-piloting aircraft, and/or the like), and the process flow 200 may include providing a command, a series of commands, and/or the like to cause one or more autonomous vehicles to transfer goods. For example, a resource management system may provide a command to cause an autonomous vehicle to navigate to a first receiving location, receive first goods at the first receiving location, navigate to a second receiving location, receive second goods at the second receiving location, navigate to a first delivery location, and deliver the first goods and the second goods to the first delivery location.

In some embodiments, the transfer containers may include personal motor vehicles, and the process flow 200 may include providing instructions to one or more user devices associated with the personal motor vehicles for efficiently receiving the plurality of resources from the plurality of receiving locations and delivering the plurality of resources to the plurality of delivery locations. For example, the instructions may provide directions for a user associated with a motor vehicle (e.g., a driver of the motor vehicle) for picking up goods and delivering goods. In such an example, the instructions may include directions for navigating within a neighborhood, city, county, state, and/or the like and an order for picking up the goods and delivering the goods while navigating within the neighborhood, city, county, state, and/or the like. In some embodiments, the instructions and/or the directions may provide the user with the most efficient (e.g., least time consuming, least fuel consuming, and/or the like) path and/or order for picking up the goods and delivering the goods.

Although descriptions of FIG. 2 include a system performing one or more of the steps of process flow 200, in some embodiments, one or more user devices, with or without assistance from another system, may perform one or more of the steps of process flow 200. Additionally, or alternatively, the one or more user devices may provide data and/or information to another system and perform one or more of the steps of process flow 200 in conjunction with the other system (e.g., in real-time or near real-time).

In some embodiments, the process flow 200 may include performing one or more of the functions described herein using machine learning and/or a machine learning model. For example, a system (e.g., a resource management system and/or the like) may provide characteristics of resource distributions (e.g., resources transferred, types of resources transferred, entities associated with resource distributions, and/or the like), characteristics of transfers (e.g., receiving locations, delivery locations, times and/or dates of transfers, transfer containers used for transfers, types of transfer containers used for transfers, carriers performing transfers, carrier resources used for transfers, types of carrier resources used for transfers), characteristics of transfer containers (e.g., dimensions of transfer containers, weights of transfer containers, capacities of transfer containers, capabilities of transfer containers, such as refrigeration, cooling, heating, and/or the like, locations of transfer containers, and/or the like), target efficiency rates, achievable efficiency rates, actual efficiency rates, outcomes of transfers, and/or the like to a machine learning model trained (e.g., using historical data) to output instructions for achieving target efficiency rates for transfer containers.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system can additionally or alternatively leverage a probabilistic module, heuristic module, deterministic module, or any other suitable module leveraging any other suitable computation method, machine learning method or combination thereof. However, any suitable machine learning approach can otherwise be incorporated in the system. Further, any suitable model (e.g., machine learning, non-machine learning, etc.) can be used in generating data relevant to the system. In some embodiments, the one or more machine learning algorithms may be predictive modeling algorithms configured to use data and statistics to predict outcomes with forecasting models.

In some embodiments, the machine learning model may be generated by training on data regarding characteristics of resource distributions, characteristics of transfers, characteristics of transfer containers, target efficiency rates, achievable efficiency rates, actual efficiency rates, outcomes of transfers, and/or the like over a predetermined past period of time. In doing so, the system may be configured to determine instructions for achieving target efficiency rates for transfer containers.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for directing resource transfers based on resource distribution data, the system comprising:
at least one non-transitory storage device; and
at least one processing device coupled to the at least one non-transitory storage device, wherein the at least one non-transitory storage device comprises computer-executable program code comprising instructions configured to cause the at least one processing device to:
train, using historical data, a machine learning model to determine instructions for achieving target efficiency rates for transfer containers, wherein:
  the historical data comprises characteristics of resource distributions, characteristics of transfers, characteristics of transfer containers, target efficiency rates, achievable efficiency rates, actual efficiency rates, and outcomes of transfers;
  the target efficiency rates correspond to percentages of capacities of the transfer containers occupied while transferring resources; and
  the instructions comprise types of the transfer containers to use while receiving and delivering goods to achieve the target efficiency rates, schedules for receiving and delivering goods with the transfer containers to achieve the target efficiency rates, types of goods to combine within the transfer containers while receiving and delivering goods to achieve the target efficiency rates, orders of packing the transfer containers while receiving and delivering goods to achieve the target efficiency rates, and directions for complying with laws and regulations while receiving and delivering goods to achieve the target efficiency rates;
receive resource distribution data associated with a plurality of resource distributions, wherein the plurality of resource distributions are associated with a plurality of entities, and wherein the resource distribution data comprises payment transactions between accounts at financial institutions, a plurality of resources, a plurality of receiving locations, and a plurality of delivery locations;
determine, based on the resource distribution data, a range of possible efficiency rates for transfer containers for transferring the plurality of resources;
provide, to one or more user input systems, a graphical user input comprising the range of possible efficiency rates and selection features;
receive user input via the selection features of the graphical user input selecting a target efficiency rate for the transfer containers, wherein the target efficiency rate corresponds to a percentage of capacity of the transfer containers occupied while the transfer containers are transferring the plurality of resources;
determine, using the machine learning model and based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations;
provide, to one or more user devices, the instructions for achieving the target efficiency rate for the transfer containers; and
cause an autonomous vehicle to navigate to a first receiving location of the plurality of receiving locations, receive first goods at the first receiving location, navigate to a second receiving location of the plurality of receiving locations, receive second goods at the second receiving location, navigate to a first delivery location, and deliver the first goods and the second goods to the first delivery location.

2. The system of claim 1, wherein the resource distribution data comprises, for each resource distribution:
    one or more goods, from the plurality of resources, to be transferred;
    a receiving location, from the plurality of receiving locations, for receiving the one or more goods; and
    a delivery location, from the plurality of delivery locations, for delivering the goods.

3. The system of claim 1, wherein the plurality of entities comprises a plurality of merchants, and wherein the plurality of delivery locations are associated with the plurality of merchants.

4. The system of claim 1, wherein the plurality of entities comprises a plurality of merchants, and wherein the plurality of delivery locations are associated with customers of the plurality of merchants.

5. The system of claim 1, wherein the transfer containers comprise at least one of shipping containers, boxes, semi-trailers, box trucks, flatbed trailers, refrigerator trailers, vans, or rail cars.

6. The system of claim 1, wherein the one or more user devices are associated with a carrier for transporting goods via at least one of land, sea, or air.

7. The system of claim 1, wherein the plurality of resources comprises a plurality of goods, and wherein the instructions comprise carrier resources for transferring the plurality of goods.

8. The system of claim 7, wherein the carrier resources comprise different types of motor vehicles, different types of vessels, and different types of aircraft.

9. The system of claim 1, wherein the plurality of resources comprises a plurality of goods, and wherein the instructions comprise an order for receiving the plurality of goods from the plurality of receiving locations and delivering the plurality of goods to the plurality of delivery locations while maintaining the target efficiency rate for the transfer containers.

10. The system of claim 1, wherein the at least one processing device is configured to:
    determine, based on the resource distribution data and the target efficiency rate, first instructions for achieving the target efficiency rate for a first transfer container of the transfer containers while receiving, with the first transfer container, third goods from a third receiving location associated with a first merchant and fourth goods from a fourth receiving location associated with a second merchant and delivering, with the first transfer container, the third goods to a third delivery location and the fourth goods to a second delivery location; and
    provide, to a user device associated with the first transfer container, the first instructions comprising directions to:
        receive the third goods at the third receiving location;
        after receiving the third goods, receive the fourth goods at the fourth receiving location;
        after receiving the fourth goods, deliver the fourth goods to the second delivery location; and
        after delivering the fourth goods, deliver the third goods to the third delivery location.

11. The system of claim 1, wherein the at least one processing device is configured to:
    determine, based on the resource distribution data, an achievable efficiency rate for the transfer containers;
    determine whether the achievable efficiency rate corresponds to or is greater than the target efficiency rate; and
    provide, to the one or more user devices and based on determining that the achievable efficiency rate does not correspond to and is not greater than the target efficiency rate, a notification that the target efficiency rate cannot be achieved.

12. The system of claim 1, wherein the at least one processing device is configured to:
    determine, based on the resource distribution data, that a first merchant of the plurality of entities requested a first transfer of a first quantity of third goods from a third receiving location to a third delivery location;
    determine, based on the resource distribution data, that a second merchant of the plurality of entities requested a second transfer of a second quantity of the third goods from the third receiving location to a second delivery location;
    determine whether a distance between the third delivery location and the second delivery location satisfies a threshold;
    provide, to a first user device associated with the first merchant and based on determining that the distance between the third delivery location and the second delivery location satisfies the threshold, a first request for authorization to combine the first transfer with the second transfer;
    provide, to a second user device associated with the second merchant and based on determining that the distance between the third delivery location and the second delivery location satisfies the threshold, a second request for authorization to combine the second transfer with the first transfer;
    receive, from the first user device, a first authorization to combine the first transfer with the second transfer;
    receive, from the second user device, a second authorization to combine the second transfer with the first transfer; and
    provide, to one or more user devices associated with a carrier and based on receiving the first authorization and the second authorization, first instructions comprising directions to:
        receive the first quantity and the second quantity of the third goods from the third receiving location with a first transfer container;
        after receiving the first quantity and the second quantity of the third goods from the third receiving location, deliver, with the first transfer container, the first quantity of third goods to the first delivery location; and
        after receiving the first quantity and the second quantity of the third goods from the first receiving location, deliver, with the first transfer container, the second quantity of third goods to the second delivery location.

13. The system of claim 12, wherein the at least one processing device is configured to:
    determine, based on the resource distribution data, at least one of:
        a first portion of insurance for which the first merchant is responsible and a second portion of insurance for which the second merchant is responsible;
        a first time for receiving the third goods from the third receiving location;
        an order of packing the third goods within the first transfer container; or
        types of goods permitted within the first transfer container.

14. A computer program product for directing resource transfers based on resource distribution data, the computer program product comprising a non-transitory computer-readable medium comprising code causing a first apparatus to:
  train, using historical data, a machine learning model to determine instructions for achieving target efficiency rates for transfer containers, wherein:
    the historical data comprises characteristics of resource distributions, characteristics of transfers, characteristics of transfer containers, target efficiency rates, achievable efficiency rates, actual efficiency rates, and outcomes of transfers;
    the target efficiency rates correspond to percentages of capacities of the transfer containers occupied while transferring resources; and
    the instructions comprise types of the transfer containers to use while receiving and delivering goods to achieve the target efficiency rates, schedules for receiving and delivering goods with the transfer containers to achieve the target efficiency rates, types of goods to combine within the transfer containers while receiving and delivering goods to achieve the target efficiency rates, orders of packing the transfer containers while receiving and delivering goods to achieve the target efficiency rates, and directions for complying with laws and regulations while receiving and delivering goods to achieve the target efficiency rates;
  receive resource distribution data associated with a plurality of resource distributions, wherein the plurality of resource distributions are associated with a plurality of entities, and wherein the resource distribution data comprises payment transactions between accounts at financial institutions, a plurality of resources, a plurality of receiving locations, and a plurality of delivery locations;
  determine, based on the resource distribution data, a range of possible efficiency rates for transfer containers for transferring the plurality of resources;
  provide, to one or more user input systems, a graphical user input comprising the range of possible efficiency rates and selection features;
  receive user input via the selection features of the graphical user input selecting a target efficiency rate for the transfer containers, wherein the target efficiency rate corresponds to a percentage of capacity of the transfer containers occupied while the transfer containers are transferring the plurality of resources;
  determine, using the machine learning model and based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations;
  provide, to one or more user devices, the instructions for achieving the target efficiency rate for the transfer containers; and
  cause an autonomous vehicle to navigate to a first receiving location of the plurality of receiving locations, receive first goods at the first receiving location, navigate to a second receiving location of the plurality of receiving locations, receive second goods at the second receiving location, navigate to a first delivery location, and deliver the first goods and the second goods to the first delivery location.

15. The computer program product of claim 14, wherein the resource distribution data comprises, for each resource distribution:
  one or more goods, from the plurality of resources, to be transferred;
  a receiving location, from the plurality of receiving locations, for receiving the one or more goods; and
  a delivery location, from the plurality of delivery locations, for delivering the goods.

16. The computer program product of claim 14, wherein the plurality of entities comprises a plurality of merchants, and wherein the plurality of delivery locations are associated with the plurality of merchants.

17. The computer program product of claim 14, wherein the plurality of entities comprises a plurality of merchants, and wherein the plurality of delivery locations are associated with customers of the plurality of merchants.

18. A method for directing resource transfers based on resource distribution data, the method comprising:
  training, using historical data, a machine learning model to determine instructions for achieving target efficiency rates for transfer containers, wherein:
    the historical data comprises characteristics of resource distributions, characteristics of transfers, characteristics of transfer containers, target efficiency rates, achievable efficiency rates, actual efficiency rates, and outcomes of transfers;
    the target efficiency rates correspond to percentages of capacities of the transfer containers occupied while transferring resources; and
    the instructions comprise types of the transfer containers to use while receiving and delivering goods to achieve the target efficiency rates, schedules for receiving and delivering goods with the transfer containers to achieve the target efficiency rates, types of goods to combine within the transfer containers while receiving and delivering goods to achieve the target efficiency rates, orders of packing the transfer containers while receiving and delivering goods to achieve the target efficiency rates, and directions for complying with laws and regulations while receiving and delivering goods to achieve the target efficiency rates;
  receiving resource distribution data associated with a plurality of resource distributions, wherein the plurality of resource distributions are associated with a plurality of entities, and wherein the resource distribution data comprises payment transactions between accounts at financial institutions, a plurality of resources, a plurality of receiving locations, and a plurality of delivery locations;
  determining, based on the resource distribution data, a range of possible efficiency rates for transfer containers for transferring the plurality of resources;
  providing, to one or more user input systems, a graphical user input comprising the range of possible efficiency rates and selection features;
  receiving user input via the selection features of the graphical user input selecting a target efficiency rate for the transfer containers, wherein the target efficiency rate corresponds to a percentage of capacity of the transfer containers occupied while the transfer containers are transferring the plurality of resources;

determining, using the machine learning model and based on the resource distribution data and the target efficiency rate, instructions for achieving the target efficiency rate for the transfer containers while receiving, with the transfer containers, the plurality of resources from the plurality of receiving locations and delivering, with the transfer containers, the plurality of resources to the plurality of delivery locations;

providing, to one or more user devices, the instructions for achieving the target efficiency rate for the transfer containers; and causing an autonomous vehicle to navigate to a first receiving location of the plurality of receiving locations, receive first goods at the first receiving location, navigate to a second receiving location of the plurality of receiving locations, receive second goods at the second receiving location, navigate to a first delivery location, and deliver the first goods and the second goods to the first delivery location.

19. The method of claim 18, wherein the resource distribution data comprises, for each resource distribution:

one or more goods, from the plurality of resources, to be transferred;

a receiving location, from the plurality of receiving locations, for receiving the one or more goods; and a delivery location, from the plurality of delivery locations, for delivering the goods.

20. The method of claim 18, wherein the plurality of entities comprises a plurality of merchants, and wherein the plurality of delivery locations are associated with the plurality of merchants.

* * * * *